W. T. DOREMUS.
Screw and Pivot Chairs.

No. 152,087. Patented June 16, 1874.

WITNESSES.
A. W. Almqvist

INVENTOR.
W. T. Doremus
BY
ATTORNEYS.

UNITED STATES PATENT OFFICE.

WILLIAM T. DOREMUS, OF NEW YORK, N. Y.

IMPROVEMENT IN SCREW AND PIVOT CHAIRS.

Specification forming part of Letters Patent No. 152,087, dated June 16, 1874; application filed March 7, 1874.

*To all whom it may concern:*

Figure 1:
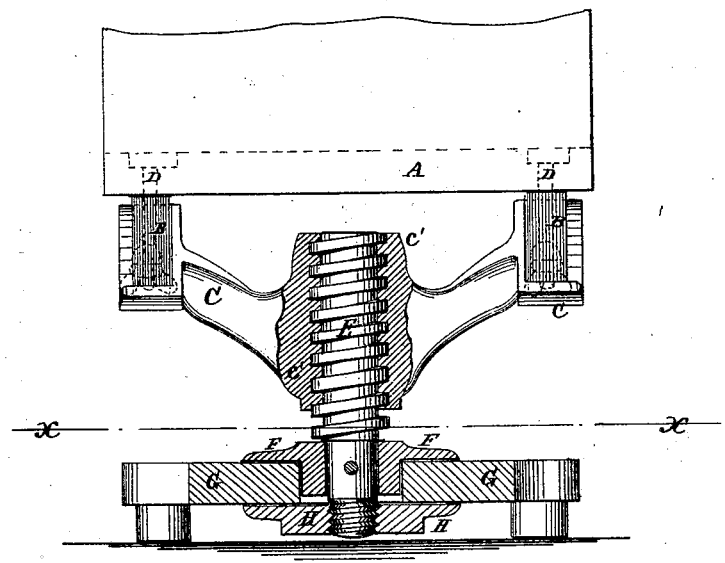
Figure 2:
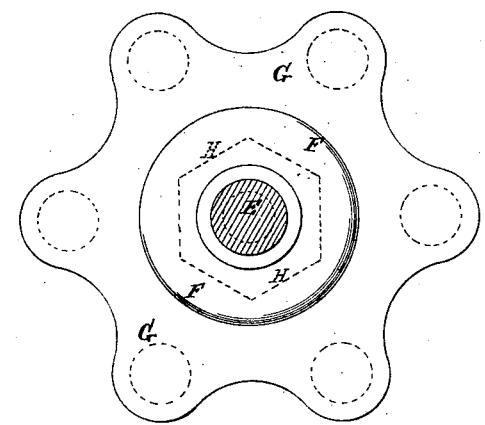

Be it known that I, WILLIAM T. DOREMUS, of New York city, in the county and State of New York, have invented a new and useful Improvement in Screw and Pivot Chairs, of which the following is a specification:

Figure 1 is a detailed sectional view of a portion of a screw-chair illustrating my invention. Fig. 2 is a horizontal section of the same taken through the line $x\,x$, Fig. 1.

Similar letters of reference indicate corresponding parts.

The invention will first be fully described, and then pointed out in the claim.

A represents the chair-seat, which rests upon the rubber springs B. C is a cross-bar, upon the ends of which are formed seats for the rubber springs B, and which is secured to the seat A by bolts D, which also pass through the rubber springs B. In the center of the cross-bar C is formed a long socket, $c'$, in the inner surface of which is formed a screw-thread, into which fits the thread of the screw E. The lower end of the screw E enters a hole in the center of the plate F, and is secured in place by a pin, which passes through it, and through a collar formed solidly upon the lower side of the said plate F, and which fits into a hole in the center of the base or pedestal G. The lower end of the screw E has a finer screw-thread formed upon it, which fits into the screw-thread formed in the plate H placed upon the lower side of the base G, and which has a collar formed upon its lower side to give a longer bearing to the screw, and which is made polygonal in form, so that a wrench may be readily applied to it for screwing the plate H on and off. By this construction screw E will be securely connected with the base, so that it will be firmly held, and will wholly remove the difficulty heretofore experienced, in securing the screw or pivot socket to said base. This construction also enables the pedestal or base to be made low to better adapt the chair for being upholstered; and also enables it to be made lighter than is possible when the screw or pivot socket is attached to said base.

Having thus described my invention, what I claim as new, and desire to secure by Letters Patent, is—

The combination of chair-screw E, having independent end thread, the top plate F bolted thereto, the base G, and nut-plate H, all constructed and applied together, as and for the purpose specified.

WILLIAM T. DOREMUS.

Witnesses:
JAMES T. DOREMUS,
T. B. MOSHER.